US008235290B1

(12) United States Patent
Beveridge (10) Patent No.: US 8,235,290 B1
(45) Date of Patent: Aug. 7, 2012

(54) EFFICIENT INVENTORY AND INFORMATION MANAGEMENT

(76) Inventor: Brett Beveridge, Miami, FL (US)

( * ) Notice: Subject to any disclaimer, the term of this patent is extended or adjusted under 35 U.S.C. 154(b) by 329 days.

(21) Appl. No.: 12/703,509

(22) Filed: Feb. 10, 2010

Related U.S. Application Data

(62) Division of application No. 11/647,392, filed on Dec. 28, 2006, now Pat. No. 7,681,791.

(60) Provisional application No. 60/754,260, filed on Dec. 28, 2005.

(51) Int. Cl.
*G06K 7/10* (2006.01)
(52) U.S. Cl. .......................... 235/385; 235/382
(58) Field of Classification Search .................. 235/382,
235/381, 384, 375, 492, 385
See application file for complete search history.

(56) References Cited

U.S. PATENT DOCUMENTS

| | | | |
|---|---|---|---|
| 6,323,775 B1 | 11/2001 | Hansson | |
| 6,601,764 B1 | 8/2003 | Goodwin | |
| 6,748,213 B1 | 6/2004 | Kim | |
| 6,795,707 B2 | 9/2004 | Martin et al. | |
| 6,836,653 B1 | 12/2004 | Kang | |
| 7,103,368 B2 | 9/2006 | Teshima | |
| 7,120,436 B2 | 10/2006 | Kim | |
| 7,584,886 B2 * | 9/2009 | Labaton | 235/379 |
| 7,675,412 B2 | 3/2010 | Adra | |
| 7,681,791 B1 | 3/2010 | Beveridge | |
| 2003/0014631 A1 * | 1/2003 | Sprague | 713/168 |
| 2004/0224682 A1 | 11/2004 | Kang | |
| 2005/0149438 A1 | 7/2005 | Williams | |
| 2005/0151655 A1 | 7/2005 | Hamrick et al. | |
| 2005/0199711 A1 * | 9/2005 | Vidal | 235/380 |
| 2007/0067267 A1 | 3/2007 | Ives | |
| 2007/0198335 A1 * | 8/2007 | Edwards et al. | 705/14 |
| 2007/0270205 A1 | 11/2007 | Al-Ziyoud | |
| 2008/0000968 A1 | 1/2008 | Cato et al. | |
| 2008/0017704 A1 * | 1/2008 | VanDeburg et al. | 235/380 |
| 2008/0257953 A1 * | 10/2008 | Wolf | 235/379 |
| 2011/0258122 A1 * | 10/2011 | Shader et al. | 705/67 |
| 2012/0066081 A1 * | 3/2012 | Shader et al. | 705/18 |

OTHER PUBLICATIONS

U.S. Official Action dated Oct. 27, 2010 in U.S. Appl. No. 12/703,489.
Article entitled, "Westlake Integrates an End-to-End Wireless Supply Chain Management Solution for Nextel National Retail," authored by Westlake Software, Inc., Third Quarter, 2005; pp. 1-11.
U.S. Official Action dated Apr. 18, 2007 in U.S. Appl. No. 11/647,392.
U.S. Official Action dated Oct. 9, 2007 in U.S. Appl. No. 11/647,392.

(Continued)

*Primary Examiner* — Thien M Le
(74) *Attorney, Agent, or Firm* — Hope Baldauff Hartman, LLC (57) ABSTRACT

Methods and computer-readable media provide for efficient inventory and information management over a wireless network. A form customized for a specific business is received at a wireless data input device. The form is completed and a command to send the completed form to a remote server is received. Stored location data for the business corresponding to the form to be sent is compared to location data corresponding to the wireless data input device. If the comparison indicates that the wireless input device is within a specified threshold distance of the business, the wireless data input device is permitted to send the completed form to the server. If the wireless input device is outside the specified threshold distance, the wireless data input device is not permitted to send the completed form.

6 Claims, 6 Drawing Sheets

OTHER PUBLICATIONS

U.S. Official Action dated Jan. 28, 2008 in U.S. Appl. No. 11/647,392.
U.S. Official Action dated Jun. 13, 2008 in U.S. Appl. No. 11/647,392.
U.S. Supplemental Official Action dated Aug. 27, 2008 in U.S. Appl. No. 11/647,392.
U.S. Official Action dated Feb. 24, 2009 in U.S. Appl. No. 11/647,392.
U.S. Notice of Allowance/Allowability dated Jul. 23, 2009 in U.S. Appl. No. 11/647,392.
U.S. Notice of Allowance dated Feb. 15, 2012 in U.S. Appl. No. 12/703,489.

* cited by examiner

EFFICIENT INVENTORY AND INFORMATION MANAGEMENT

CROSS-REFERENCE TO RELATED APPLICATIONS

This is a divisional application of U.S. Pat. No. 7,681,791, entitled "Efficient Inventory and Information Management," filed Dec. 28, 2006 now U.S. Pat. No. 7,681,791, and also claims priority to U.S. Provisional Application No. 60/754,260, entitled "Computer-Readable Medium, System, and Method for Inventory and Information Management," filed Dec. 28, 2005, which are incorporated by reference herein in their entirety.

BACKGROUND

National retailers rely on their account representatives for effective management of inventory and sales throughout the retail stores in which their products are sold. For example, a mobile telecommunications company might sell mobile telephones at a variety of retail stores such as WAL-MART, K-MART, CIRCUIT CITY, BEST BUY, OFFICE DEPOT, and STAPLES throughout the nation. The company assigns account representatives ("AR") to service the retail stores within a designated geographical area, ensuring that the retail stores within that area maintain the proper inventory and controlling the flow of information between the telecommunications company and the retail store. Examples of information collected by ARs and reported to the company includes, but is not limited to, store location, time and date of store visit, reason for the store visit, inventory quantities, sales information, quality control information, store personnel information, sales forecasting, and information regarding any identified problems or required follow-ups.

ARs utilize a variety of tools to collect and report information regarding the retail stores for which they are responsible. Much of the information is collected utilizing paper forms. This information is then typically typed into a database system for analysis and report generation. This method is very tedious, time consuming, and costly since the information is manually entered into the paper forms and then entered a second time into a computer system. Alternatively, some companies utilize electronic data entry. Data at the store location is entered into an electronic device developed specifically for this purpose. The device then uploads the data into the company's database when the AR returns from the field, or the device may transmit the information over a phone line directly to a company database or to a storage location where it is later input into the database.

There are many opportunities for improvement with these current data collection systems. First, many of the tools that ARs use to do their jobs correspond to a substantial business expense for the company. Paper forms are used in large quantities and may be very expensive, environmentally unfriendly, and largely ineffective for ensuring follow-up action is taken. Electronic devices used by some ARs to input inventory statistics and to order products for the retail stores are expensive to purchase and maintain, and they take up storage space when not in use. Additionally, present data collection systems require unnecessary information to be input or require information to be repeatedly input into the system. For every extra step that an AR must take to collect the applicable information from the retail store and to input the data into an appropriate database, time is lost, productivity decreases, and consequently, an opportunity for saving money is lost. Similarly, decreased productivity from the ARs due to time consuming information collection steps prohibits the company from servicing the retail stores with maximum speed and efficiency, which decreases customer satisfaction. Many forms used by ARs for tracking inventory and managing their assigned retail stores require the AR to input extraneous data and are difficult to navigate, creating additional steps for the ARs and decreasing productivity.

An unfortunate effect of the pressure on an AR to perform efficiently without the tools to do so is that some ARs may be tempted to input data for a retail store without actually visiting the store. When this occurs, inaccurate inventory and sales information is acted upon by the company, creating sales and customer relation problems. Moreover, there are times that an AR may visit a retail store, but will not spend an adequate amount of time at the store to satisfactorily perform his duties. A store manager might challenge the assertion that an AR actually visited a retail store or the time spent in a store. Without a definitive record of the visit that includes the amount of time that an AR spent at the retail store and that shows, without question that information was transmitted from the retail store at a certain time, it is difficult to prove that an AR visited a retail store and spent an appropriate amount of time at the store.

Being able to accurately track the movement of ARs, including where ARs go, when they arrive, and how long they stay, not only ensures that ARs are doing their jobs, but also allows for improved scheduling capabilities. With ARs often being responsible for a large number of retail stores, or a complicated visit schedule, it is extremely important to schedule visits in the most efficient manner possible. These challenges associated with monitoring the movements of ARs while increasing the efficiency of their data collection applies not only to the retail industry, but also to any industry where a representative travels between locations collecting information.

For example, fleet management personnel track vehicles and drivers, government agencies track employees such as social workers and child welfare workers to ensure home visits are being made, pharmaceutical representatives visit doctors' offices and pharmacies, law enforcement or parole officers visit persons subject to home arrest or other conditions of incarceration, and service personnel travel to residential and business locations to perform repair work. There are virtually endless scenarios in which it is helpful to effectively track personnel for monitoring and scheduling purposes while increasing the efficiency of the personnel collecting data.

It is with respect to these and other considerations that the disclosure made herein is provided.

SUMMARY

Methods and computer-readable media provide for efficient inventory and information management over a wireless telecommunications network. According to aspects of the disclosure presented herein, a form customized for a specific business is received at a data input device. According to various embodiments, the data input device may be a cellular phone, personal data assistant, or any device capable of data input and storage and wireless data transfer capabilities. The data input device receives response data corresponding to the to each applicable field input on the form.

This response data is used to populate the form and a request is sent to submit the completed form to a server computer. The current geographic location of the data input device is determined and sent to the server computer. A response to the request to submit the completed form is received. If the request has been accepted, then the data input device sends the completed form to the server computer for storage. If the request has not been accepted, then the request is resubmitted when the current geographic location of the data input device is within a pre-defined perimeter of the business.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to systems, methods, and computer-readable media for providing efficient inventory and information management over a wireless telecommunications network. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

For illustration purposes, the following description is written in terms of an AR servicing a retail store. It should be understood that embodiments described herein are equally applicable to any industry in which a representative visits a remote location, collects data, and reports back to a central location. Other examples include fleet management personnel who track vehicles and drivers, government agencies that track employees such as social workers and child welfare workers performing home visits, pharmaceutical representatives who visit doctors' offices and pharmacies, law enforcement or parole officers who visit persons subject to home arrest or other conditions of incarceration, and service personnel who travel to residential and business locations to perform repair work.

Implementations of the disclosure presented herein allow a company to use a wireless communication network with existing cellular telephones, personal data assistants, or other data input devices carried by their ARs to communicate information from retail stores to a private Extranet or other network that utilizes the collected data to produce extensive reports. Customized forms located on the data input devices are populated with data for each corresponding retail store, saving steps and time to increase the efficiency of the ARs. Completed forms may only be sent if the data input device is within a threshold distance from the retail store corresponding to the data being sent, ensuring that ARs are visiting the stores and providing proof of visit time, duration, and date. The system allows for automatic real-time emails from the ARs data input device for alerting appropriate personnel of various conditions. The system similarly allows for communication from managers or other company personnel to ARs while they are servicing their assigned retail locations.

Figure 1:
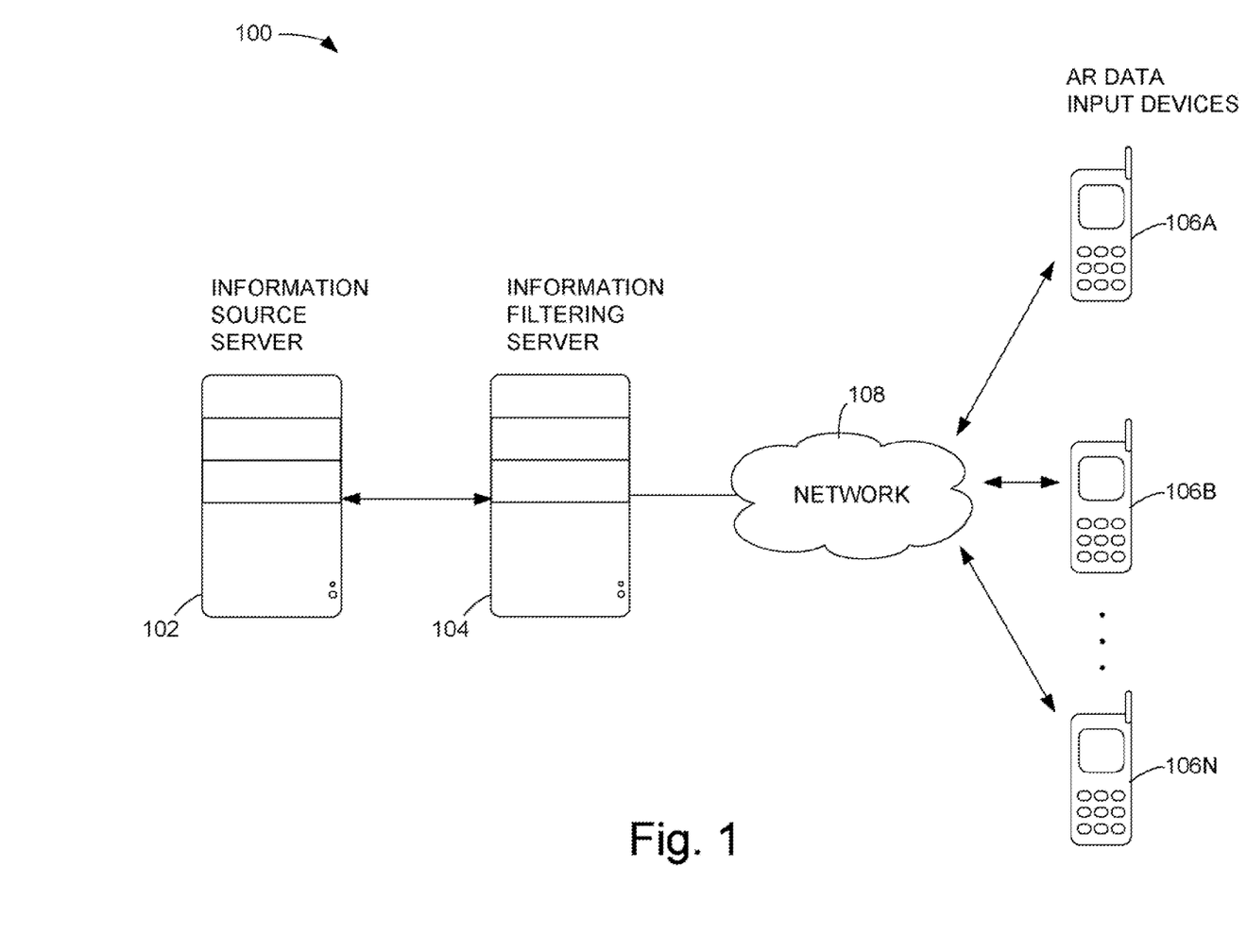
FIG. 1 is a system diagram illustrating the flow of data between components of a system according to one embodiment presented herein.

FIG. 1 shows a system containing an information source server ("ISS") 102, an Information Filtering Server ("IFS") 104, and AR wireless data input devices 106A-106N according to one embodiment disclosed herein. Corporate personnel input data into the ISS 102 such as AR identifications, store assignments, store locations including Global Positioning System ("GPS") coordinates, and any additional information regarding retail stores and ARs that may be deemed necessary. This information is exported to the IFS 104. The IFS 104 acts as a central repository for information flowing from the ISS 102 and AR data input devices. The IFS 104 contains middleware that integrates information sent from the ISS 102 with information input by ARs utilizing wireless data input devices 106A-106N for reporting, tracking, analysis, forecasting, and administration purposes. It is to be understood that the ISS 102 and IFS 104 may be a single server or separate servers. Changes made to company data at the ISS 102 are automatically reflected in corresponding data stored on the IFS 104 and sent to the wireless data input devices 106A-106N. For example, if a corporate information manager reassigns stores to various ARs, the assignments are sent to the IFS 104 where the IFS 104 updates the appropriate forms with information corresponding to the new stores assigned to each AR and transmits the forms to the corresponding AR wireless data input devices 106A-106N.

The AR wireless data input devices 106A-106N may be any devices capable of data input and storage and wireless data transfer capabilities via the network 108 such as cellular telephones, BLACKBERRIES, and other personal data assistants. The wireless data input devices 106A-106N have GPS or other location detection means for transmitting the location of each device to the IFS 104 for determination as to whether the wireless data input device 106 is within the appropriate geo-fence as described below with respect to FIG. 3.

Implementations of the disclosure provided herein improve AR efficiency by customizing data input forms to minimize the amount of information that each AR is required to input, while maximizing the quality of that information. Typical data input forms currently in use are generic so that they may be used for all retail stores that an AR might visit. These forms require ARs to input the name and location of each store as well as additional information each time they visit a store, even though that information has not changed.

Additionally, these forms are often paper, which can be expensive, cumbersome, and require storage space. Implementations of the disclosure presented herein utilize electronic retail store data input forms that are easily customizable and accessible via software stored on an AR's cellular phone or other wireless data input device 106. The forms include all information about a specific retail store that management would want for taking action or performing analysis. Client software on the wireless data input devices 106A-106N accesses the forms and walks the AR through a series of questions or input fields applicable to that particular retail store.

Information that does not change with each visit is auto-populated to save the AR time. For example, when an AR enters a store identifier, the form is populated with information such as the address, date, time, name of the store manager, and any other information that is automatically recorded by the wireless data input device 106 or is unlikely to change with each visit. Information from the previous visit may also be auto-populated so that the AR only has to amend the form with the information that has changed since the last visit. This auto-populating information, or store profile, may be stored on the wireless data input device 106 or at the IFS 104. The store profile is accessible to and may be amended at any time by the AR as required.

The retail store forms according to embodiments disclosed herein are created at the IFS 104 for each AR and transmitted to each AR's wireless data input device 106. As stated above, the wireless data input devices 106A-106N contain a client application that supports the retail store forms and allows an AR to make appropriate selections and inputs into the form before transmitting the completed form back to the IFS 104. This client application may be Java 2 Micro Edition compatible or may be programmed in any appropriate programming language. The retail store forms are menu driven and are pre-loaded by the IFS 104 with all necessary questions and data input fields corresponding to the specific retail store for which the form is created. If management needs to collect specific information for a given store or for a particular time period or issue, an information manager only has to enter the appropriate questions at the ISS 102, the new questions will be sent to the IFS 104 for integration with existing retail store forms and transmitted to the appropriate AR wireless data input device 106. FIGS. 2A-2L show various screen shots from retail store forms according to various embodiments of the disclosure presented herein.

Figure 2A:
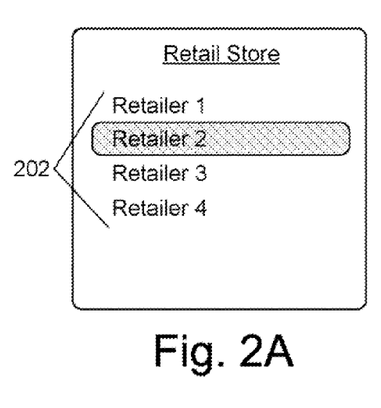
FIGS. 2A-2L are screen diagrams illustrating retail store forms according to various embodiments presented herein.
Figure 2B:
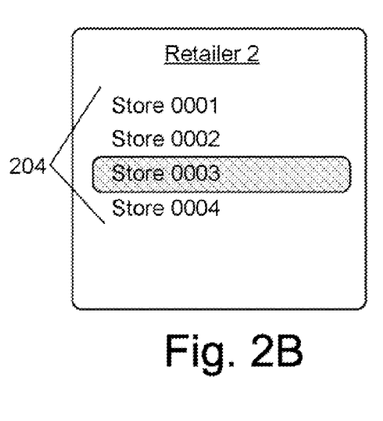
Figure 2C:
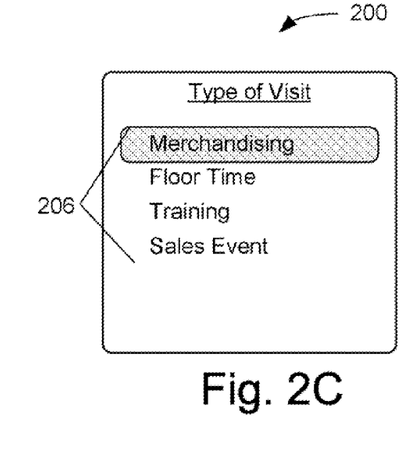
Figure 2D:
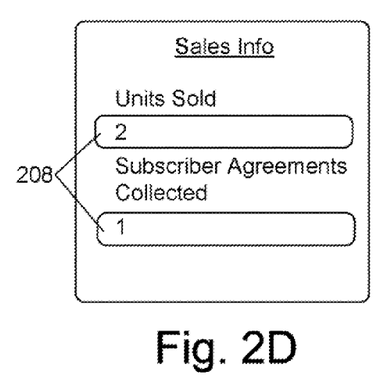
Figure 2E:
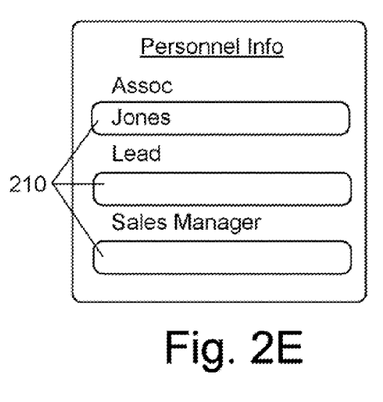
Figure 2F:
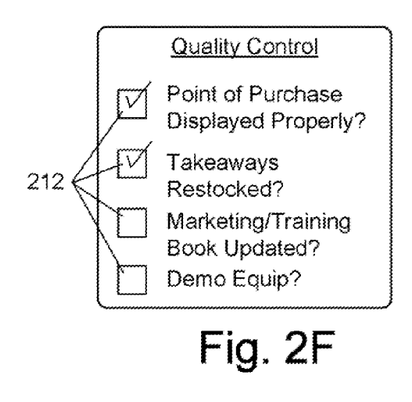

As seen in FIG. 2A, after entering the client application on a cellular phone or other wireless data input device 106, an AR may select the applicable retail store from a pre-loaded franchise list 202 of stores assigned to the AR. After selecting the retail store name, the AR may select a specific store from the franchise from a store list 204 if more than one store from the franchise is assigned to him. This action is shown in FIG. 2B. After selecting the specific store, FIG. 2C shows a list of visit-type choices 206 for identifying the type of visit. The form entries are specific to the type of visit. For example, if the AR is visiting the store for training, he would only see and answer questions on the form that relate to training, without having to enter or scroll past questions relating to inventory, ultimately saving time and money. FIG. 2D shows example sales information entry fields 208 for inputting sales information. The customized retail store forms allow for the AR to input the names of the retail store personnel that were on duty or that the AR had contact with in personnel entry fields 210, as shown in FIG. 2E. FIG. 2F shows how the forms also allow the AR to quickly and easily answer questions relating to quality control by simply checking appropriate boxes 212.

Figure 2G:
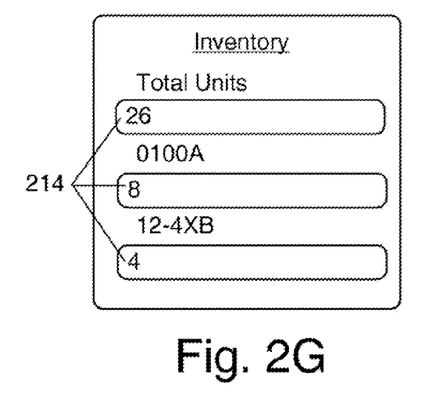
Figure 2H:
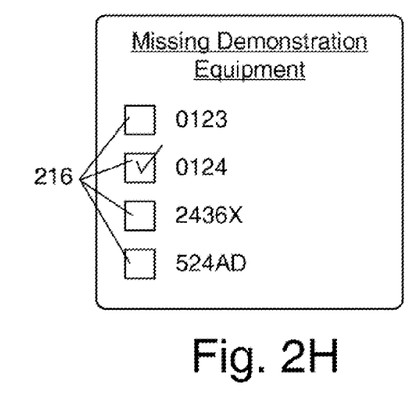
Figure 2I:
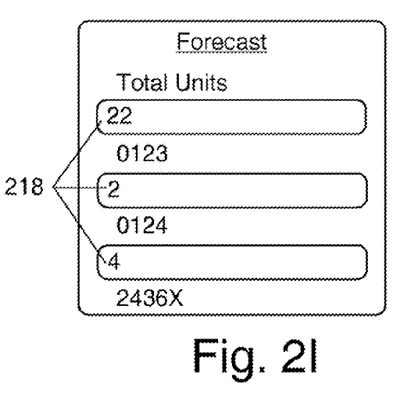

FIGS. 2G-2I illustrate additional input screens that allow the AR to quickly enter inventory information 214, information regarding missing demonstration equipment 216, and sales forecasting information 218.

Figure 2J:
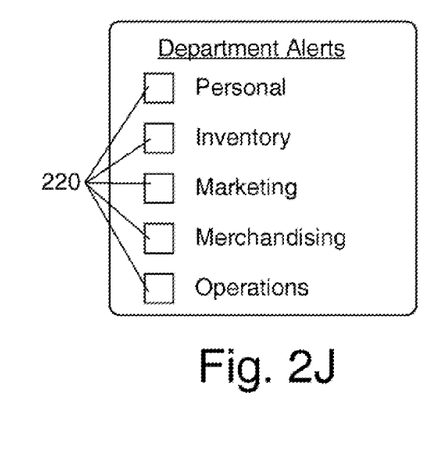
Figure 2K:
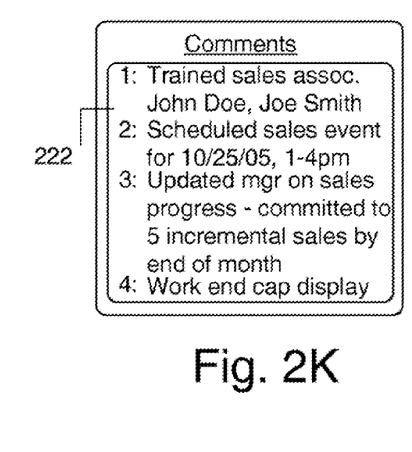
Figure 2L:
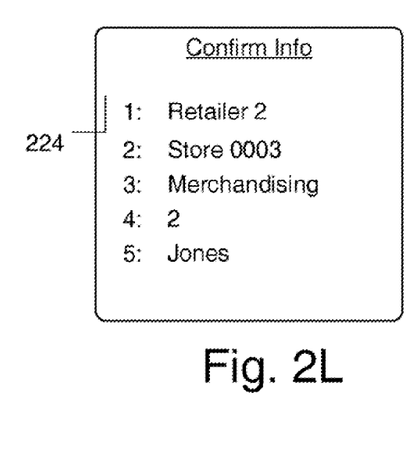

FIG. 2J shows options 220 for adding department alerts to a submission. Creating a personal alert will trigger an electronic mail ("email") to the AR that is sending the completed retail store form. Using this feature, the AR can email the form to himself when it is submitted to the IFS 104. The AR might do this to remind himself to follow up on a particular issue. Alternatively, the AR might create an alert that emails the submission to a designated department or department manager as well as himself. By triggering an alert, the client application will allow the AR to highlight a particular entry or to add comments 222 as seen in FIG. 2K. Comments 222 may be added to any submission whether or not an alert is created. A confirmation screen 224 is shown in FIG. 2L where the data entries are confirmed by the AR prior to submission.

Any number of thresholds may be assigned to specific actions that are tracked by the IFS 104. Store visit thresholds may be set corresponding to the number of visits required by an AR for each assigned retail store. Each product may have inventory level thresholds. Alerts may be generated at the IFS 104 based on assigned thresholds. For example, if an AR has not visited an assigned retail store a threshold number of times within a defined period, an email may be sent to a manager or the AR. Similarly, reminder emails may be sent to an AR when approaching a threshold. An AR may also generate alerts to be sent directly to their manager or any specific department at any given time for any reason. These alerts may be in the form of emails or text messages. In this manner, embodiments of the disclosure presented herein allow for real-time two-way communication between managers and ARs. Any alerts that may be sent directly to a manager are also sent to the IFS 104 where they are stored in a database. A manager may at any time access the database to get access to all alerts as they are submitted by an AR.

After verification of the data, the completed form is ready for submission to the company's Extranet. The disclosure presented herein prevents ARs from submitting the form data unless the AR is at or near the retail store for which the data was entered. By doing so, several purposes are served. First, ARs are forced to actually visit stores since data from a store may not be submitted unless the AR is within a pre-defined distance from the store. Second, a definitive electronic submission record will exist that proves where and when an AR sent the completed form from in case a retail store manager ever challenged the assertion that an AR had visited their store. Additionally, records of store visits may be stored, sorted, and analyzed, allowing management to measure the efficiency of each AR in order to determine if re-training is required or if stores are most effectively assigned to the ARs.

Figure 3:
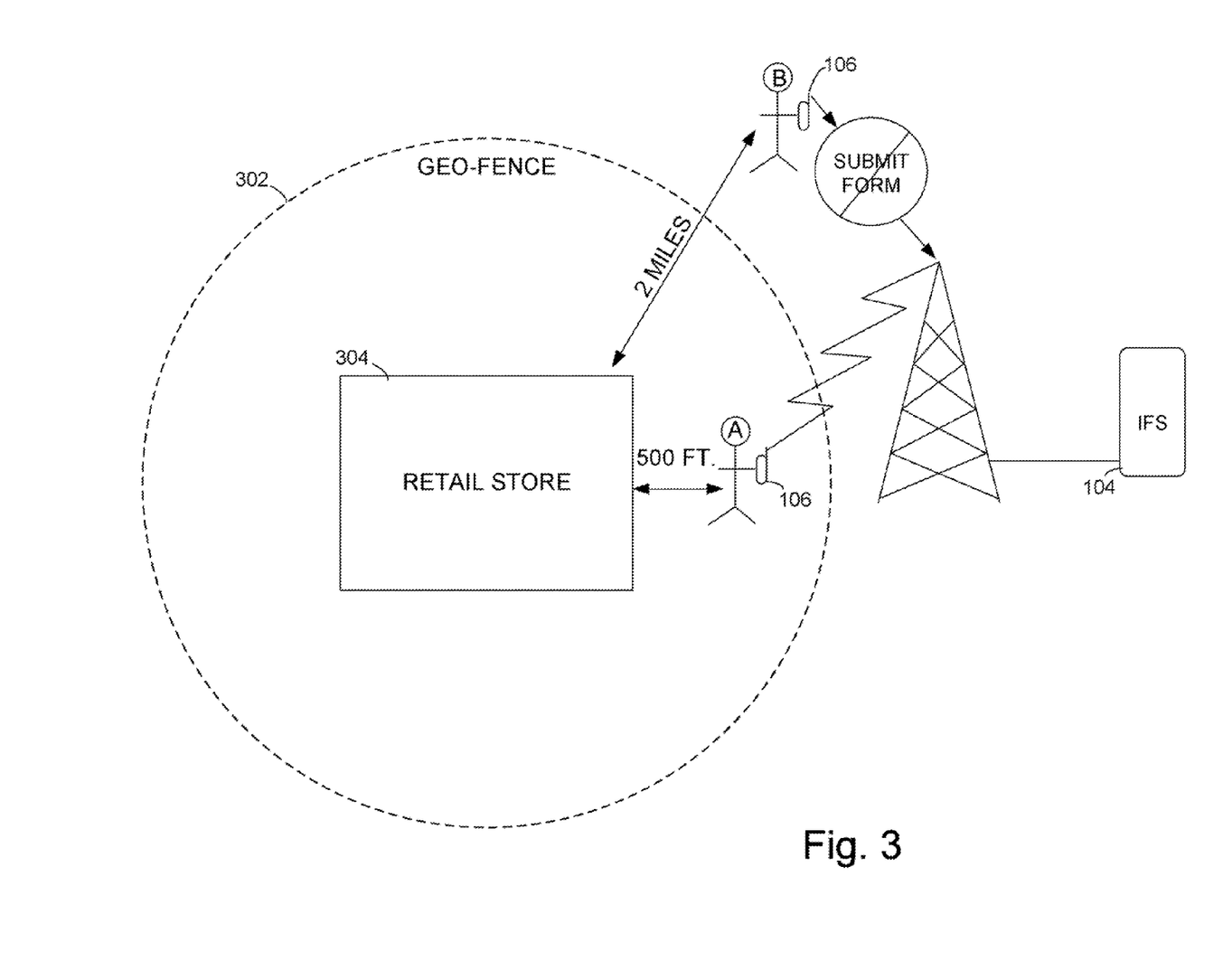
FIG. 3 is a diagram illustrating wireless data input device transmission capabilities relating to a geo-fence according to one embodiment presented herein.

The manner in which ARs are prevented from submitting completed forms is through the use of geo-fencing. Geo-fencing is placement of a non-physical boundary around a retail store, outside of which form submissions will not be permitted. FIG. 3 shows the operation of a geo-fence 302 according to one embodiment disclosed herein. A geo-fence 302 extends from the GPS coordinates of a retail store 304 outward a pre-defined distance from the retail store 304. The distance from the store that the geo-fence 302 exists is set as a threshold and stored at the IFS 104. The GPS coordinates of each retail store 304 are also stored at the IFS 104. When the wireless data input device 106 attempts to submit a completed retail store form, the wireless data input device 106 sends its current GPS coordinates to the IFS 104. Consequently, each wireless data input device 106 has a GPS receiver or some other location identification means. The IFS 104 compares the current location of the wireless data input device 106 with the coordinates of the retail store 304 for which the data was entered and compares the resulting distance to a set threshold distance. In order for an AR to be able to successfully transmit a completed retail store form, he must be physically located at the retail store 304 associated with the retail store form or within the geo-fence 302 surrounding the retail store 304.

For simplicity, a geo-fence 302 may be substantially circular in shape as it is measured as a radial threshold distance outward from the coordinates of a retail store 304. The threshold may be the same for all retail stores 304. Alternatively, each retail store 304 may have a unique geo-fence 302 depending on the geographical characteristics of the area surrounding the retail store 304, the travel characteristics to and from the retail store 304 including the route taken by an AR as defined by the assigned stores, the cellular network coverage around a retail store 304, or any other factor that might necessitate a unique geo-fence 302. The geo-fence 302 may be any shape or size. If the geo-fence 302 is not circular, then the determination as to whether the wireless data input device 106 is within the geo-fence 302 would not be possible based solely on comparison with a threshold distance from the retail store 304. In this situation, a determination would be made as to whether the GPS coordinates of the wireless data input device 106 are encompassed by the area comprising the geo-fence 302 defined by the each coordinate of the boundary of the geo-fence 302. The latitude and longitudes of the present location of the wireless data input device 106 could be compared to the outer latitudes and longitudes of the geo-fence 302 to determine if the present coordinates are within the geo-fence 302.

To use the example shown in FIG. 3, account representative A is 500 feet from retail store 304 and attempts to send a completed retail store form corresponding to retail store 304. He will be successful since the threshold for retail store 304 is set to a distance greater than 500 feet. If account representative B attempts to send a completed retail store form corresponding to retail store 304, he will not be successful since account representative B is 2 miles from retail store 304, a distance greater than the set threshold, and therefore outside of the geo-fence 302. Similarly, if account representative A attempted to send completed retail store forms for retail store 304 and for another retail store (not shown) at the same time, he would be able to send the form corresponding to retail store 304, but not the form corresponding to the other retail store since presumably account representative A is outside of the geo-fence 302 surrounding the other retail store.

An AR may save a completed retail store form for later submission and may complete a retail store form when not within the geo-fence 302 for the corresponding retail store 304; however, the AR must be within the applicable geo-fence 302 before he will be allowed to submit the retail store form. Unsuccessful attempts to submit a retail store form when not within an applicable geo-fence 302 may be stored by the IFS 104 for management analysis or alternatively may trigger an email to a designated manager with the details of the unsuccessful attempt.

Figure 4:
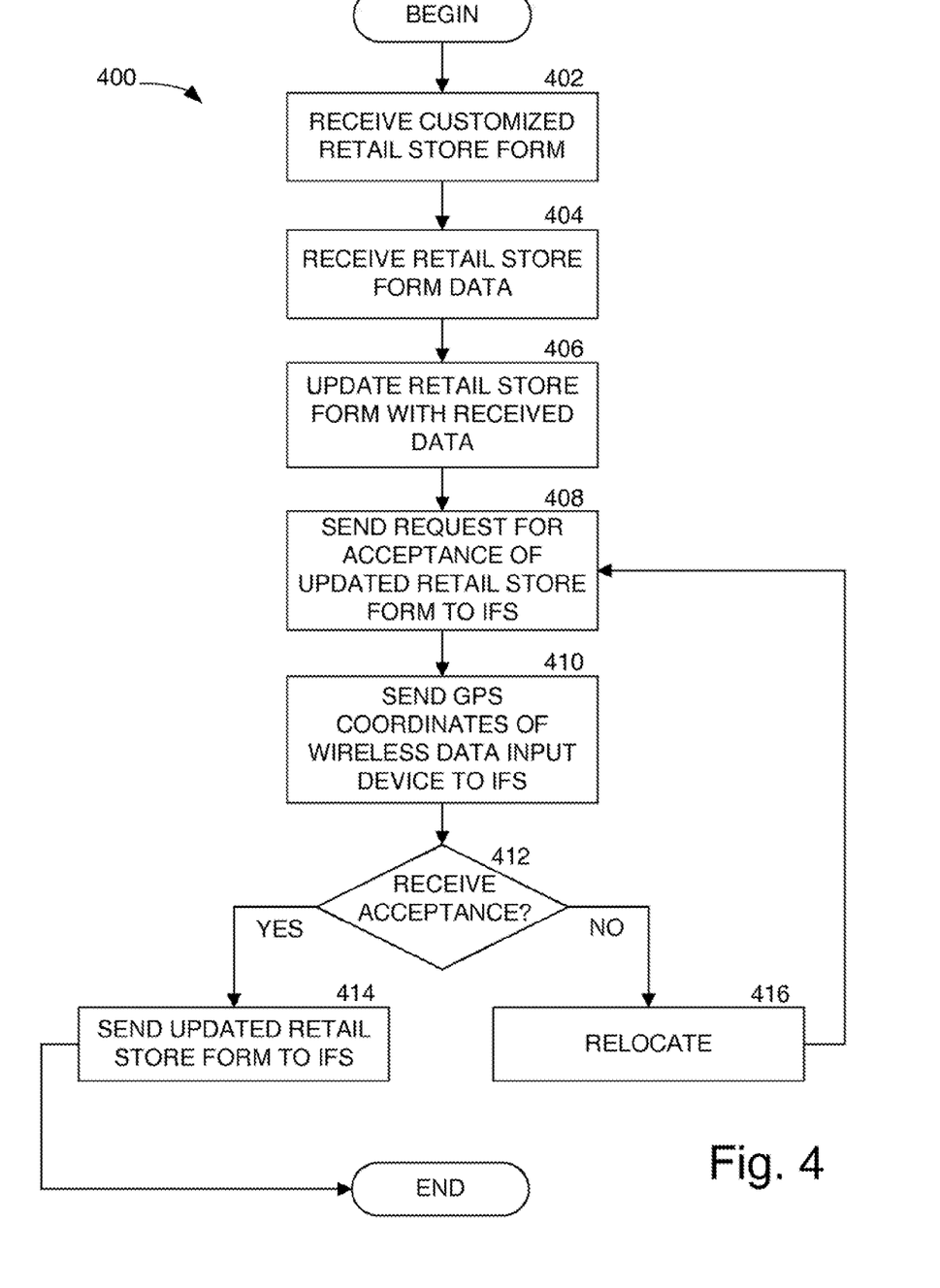
FIG. 4 is a flow diagram illustrating a retail store form submission process according to one embodiment presented herein.

Referring now to FIG. 4, an illustrative routine 400 will be described for gathering and submitting information utilizing a wireless data input device 106 according to various embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 400 will be discussed utilizing a cellular telephone as the wireless data input device 106. The routine 400 begins at operation 402, where the client software on the cellular telephone receives a customized retail store form from the IFS 104. This form initialization process occurs quickly, often within about 15 seconds depending on the wireless connection and equipment processing speed, since the form is customized for each particular store, and therefore is not as extensive as a generic form covering all possible store issues. From operation 402, the routine 400 continues to operation 404, where the cellular telephone receives data input from an AR. From operation 404, the routine 400 continues to operation 406, where the client software updates the store form with the received data. It is to be understood that the form received from the IFS 104 may be pre-loaded with data from a previous visit or may be previously stored on the telephone from a previous visit. The IFS 104 may store any number of previous forms in a database for later access and review. The telephone or other wireless device used by an AR may store up to three, or any other designated number, of previous forms so that the AR has ready access to sales and account history for each store.

The client software adds a time stamp to the form, indicating the time that the wireless device entered the retail store 304 or associated geo-fence 302 and the duration of time remaining within the store or geo-fence 302. It should be appreciated that the client software may be configured to automatically store a time stamp whenever the AR enters a geo-fence 302, or the time may be recorded when the AR executes the client software or requests a form upon entering a geo-fence 302. The routine proceeds from operation 406 to operation 408, where the client software sends a request for acceptance of the updated retail store form to the IFS 104. At operation 410, the client software accesses the GPS receiver located within the telephone and sends the present coordinates of the telephone to the IFS 104.

The routine 400 continues from operation 410 to operation 412, where a determination is made as to whether the client software received an acceptance message from the IFS 104. If the client software receives an acceptance message from the IFS 104, the routine 400 proceeds to operation 414, where the updated retail store form is sent to the IFS 104 and the process ends. However, if the client software does not receive an acceptance message from the IFS 104 or receives a denial message, then the routine 400 proceeds to operation 416, where the client software sends a subsequent request to the IFS 104 after the telephone has been relocated. The routine 400 then returns to operation 408 and continues as described above. This process continues until the cellular telephone is located within the defined geo-fence 302 for the corresponding retail store 304. The subsequent requests for acceptance of the updated retail store form may occur automatically at periodic intervals, or may occur only upon action by an AR.

Alternatively, at operation 408, rather than sending a request for acceptance of the updated retail store form to the IFS 104, the client software may send the form along with GPS coordinates of the telephone. In this situation, the client software will receive notice of whether the form was accepted or not by the IFS 104 after determining whether the telephone is within the applicable geo-fence 302. In a further embodiment, the client software may determine whether the telephone is within the applicable geo-fence 302 rather than the IFS 104. If this determination occurs within the cellular telephone, the client software will compare current GPS coordinates with stored coordinates of the corresponding retail store 304 and determine if the distance between the two coordinates is greater than a stored threshold. If not, the client software will send the updated retail store form to the IFS 104. If so, the client software will prevent the updated form from being sent until the present coordinates are within the pre-defined threshold distance. Similar to the form initialization process, the transmittal of the updated form back to the IFS 104 from the wireless device is a quick process, often within about 15 seconds depending on the wireless connection and equipment processing speed, since the form is customized for each particular store, and therefore is not as extensive as a generic form covering all possible store issues.

Figure 5:
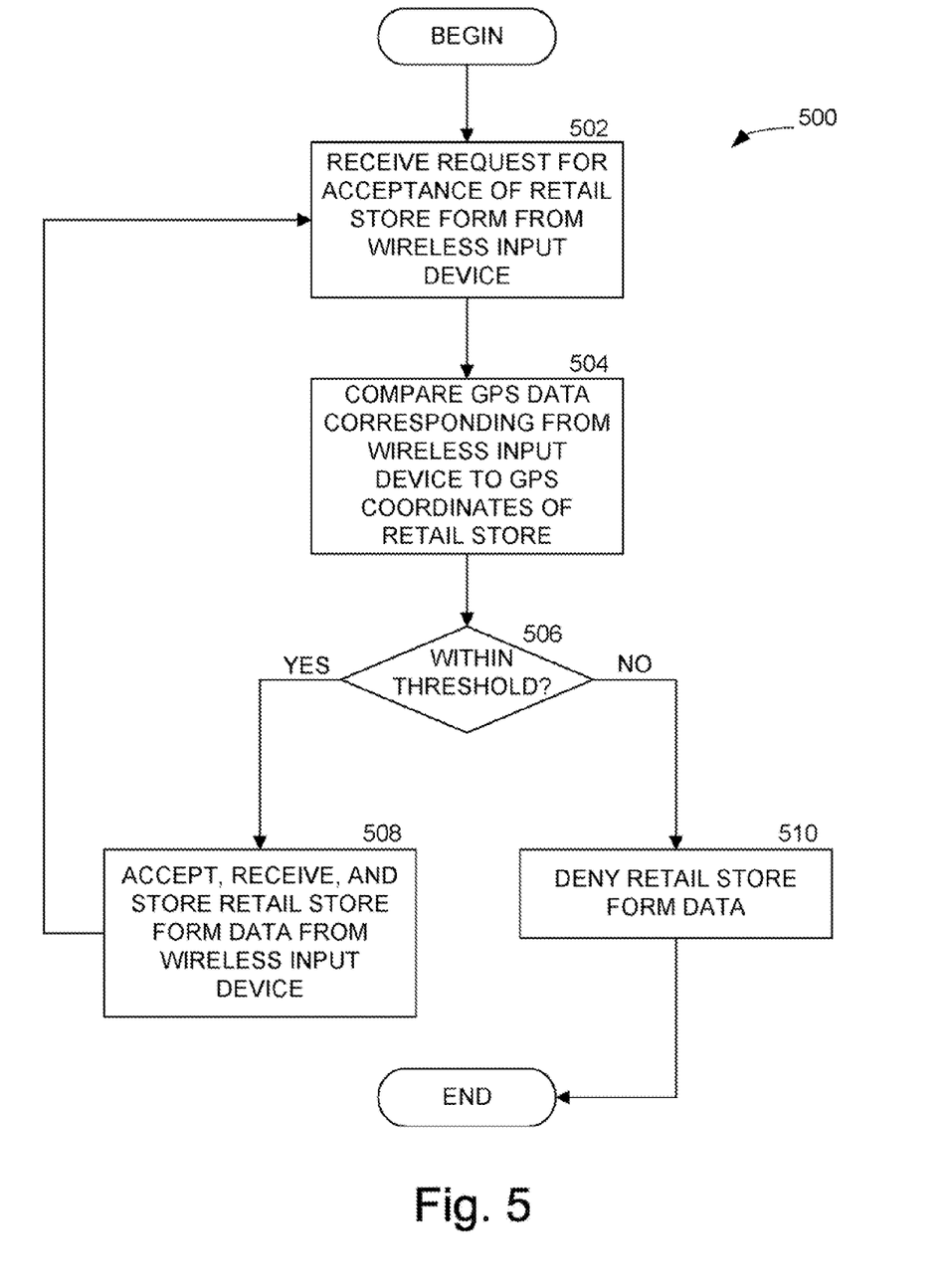
FIG. 5 is a flow diagram illustrating a retail store form acceptance process according to one embodiment presented herein.

FIG. 5 shows an illustrative routine 500 for accepting information at the IFS 104 according to one implementation described herein. The routine 500 begins at operation 502, where the IFS 104 receives a request for acceptance of a retail store form from a wireless data input device 106. From operation 502, the routine 500 continues to operation 504, where the IFS 104 compares GPS coordinates sent from the wireless data input device 106 to GPS coordinates of the retail store 304 corresponding to the submitted form. The GPS coordinates of the wireless data input device 106 may be sent separately from the form or as part of the form submission. The IFS 104 calculates the current distance between the retail store 304 and the wireless data input device 106 and compares this distance to a pre-determined threshold distance. The routine proceeds from operation 504 to operation 506, where the IFS 104 determines whether the current distance is within the threshold distance. If the current distance is within the threshold distance, meaning that the wireless data input device 106 is presently within the pre-defined geo-fence 302, the routine proceeds to operation 508 where the IFS 104 will accept, receive, and store the retail store form data from the wireless input data device 106. The routine 500 will then return to operation 502 and continue as described above.

However, if at operation 506, it is determined that the current distance is not within the threshold, then the routine 500 will proceed to operation 510, where the IFS 104 will deny or reject the retail store form data and the routine 500 ends. According to an alternate embodiment, the rejected retail store form data is stored but not accessible until the wireless data input device 106 transmits present GPS coordinates that are within the applicable geo-fence 302. IFS 104 middleware has the capability to track how often an AR visits a particular location and to monitor submissions and current GPS locations to detect where an AR is when a submission is made or attempted. The middleware may be customized to analyze, report, and display data based on submissions in a variety of ways including .XML, HTML, email, .XLS, ASCII, third party software, as well as being exported as .CSV files.

The ISS 102 and IFS 104 allows for extensive reporting capability. At any given time, a manager may view a report that gives real-time information as to the performance of the personnel over which the manager is responsible. For example, an area manager may initiate a report generation capability of an ISS 102 or IFS 104 utilizing data passed in real-time to the IFS 104 and historical data stored in a database by the IFS 104. The report might show the area manager each AR that she supervises, along with corresponding compliance percentages. If an AR has visited 50% of the stores assigned for a given month and is 20% compliant, that information is immediately available to the manager. The compliance percentage may vary from the percentage of stores visited since some stores may require multiple visits while others require only a single visit. The manager may also see summary or detail compliance values for all ARs assigned to the manager. Compliance values may be based on any designated period of time, such as percent compliant for the month, week, or day. Each person that requests a report will be given access to the information for which he or she is allowed access. The higher-level managers, will have a "bigger picture" available to them at any given time, which is an actual snapshot of the company's performance at that specific time.

The real-time information that is passed to the IFS 104 from a wireless device allows the IFS 104 to automatically create and modify schedules for ARs based on the current performance of the AR and the compliance requirements remaining for a designated time period. For example, if an AR is 40% compliant at a given time in the month, the IFS 104 may evaluate the physical locations of retail stores 304 still scheduled to be visited by the AR as well as the current or last know position of the AR based on GPS data provided by the wireless data input device 106 in order to create an updated schedule for the AR that will allow for the most efficient travel routes. Any number of variables may be used by the IFS 104 when scheduling, including but not limited to the type of required visit, number of visits, minimum or maximum time period between visits, location of stores, current location of AR, residence of AR.

An illustrative computer architecture for a computing device, such as the ISS 102, the IFS 104, and a wireless data input device 106, utilized in the various embodiments presented herein will now be described. The computing device may include a central processing unit (CPU), a system memory, including a random access memory (RAM) and a read-only memory (ROM), and a system bus that couples the memory to the CPU. A basic input/output system containing the basic routines that help to transfer information between elements within the computing device, such as during startup, is stored in the ROM. The computing device further includes a mass storage device for storing an operating system and other program modules, which will be described in greater detail below.

The mass storage device is connected to the CPU through a mass storage controller connected to the bus. The mass storage device and its associated computer-readable media provide non-volatile storage for the computing device. Although the description of computer-readable media contained herein refers to a mass storage device, such as a hard disk or CD-ROM drive, it should be appreciated by those skilled in the art that computer-readable media can be any available media that can be accessed by the computing device.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computing device.

According to various embodiments, the computing device may operate in a networked environment using logical connections to remote computers through a network 108. The computing device may connect to the network 108 through a network interface unit connected to the bus. It should be appreciated that the network interface unit may also be utilized to connect to other types of networks and remote computer systems. The computing device may also include an input/output controller for receiving and processing input from a number of other devices, including a keyboard, mouse, or electronic stylus. Similarly, an input/output controller may provide output to a display screen, a printer, or other type of output device.

As mentioned briefly above, a number of program modules and data files may be stored in the mass storage device and RAM of the computing device, including an operating system suitable for controlling the operation of networked server computers 102 and 104 and wireless data input device 106. The mass storage device and RAM may also store one or more program modules. In particular, the mass storage device and the RAM may store the client software and other program modules described above.

It will be apparent to those skilled in the art that embodiments of the disclosure presented herein may be readily integrated with existing point-of-purchase, inventory, and information technology systems. The systems described herein may supplement existing systems, adding features and capability not currently possessed by the existing system. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for servicing a business, comprising:
    receiving an account management information form at a data input device, the account management information form comprising a plurality of customized information requests corresponding to the business;
    receiving response data corresponding to the plurality of customized information requests;
    populating the account management information form with the response data;
    sending a request to submit the account management information form to a server computer;
    determining a current geographic location of the data input device;
    sending the current geographic location of the data input device to the server computer;
    receiving a response to the request to submit the account management information form from the server computer;
    determining whether the response comprises an acceptance of the request to submit the account management information form has been received from the server computer;
    if the response comprises the acceptance of the request to submit the account management information form, sending the account management information form to the server computer for storage in a repository; and
    if the response does not comprise the acceptance of the request to submit the account management information form, resubmitting the request to submit the account management information form to the server computer when the current geographic location of the data input device is within a pre-defined perimeter of the business.

2. The method of claim 1, wherein the account management information form comprises pre-populated response data when received at the data input device, the pre-populated response data corresponding to historical data stored in the repository.

3. The method of claim 1, further comprising:
    determining whether the current geographic location of the data input device is within a pre-defined perimeter surrounding the business;
    wherein sending the request to submit the account management information form to the server computer occurs if the current geographic location of the data input device is within the pre-defined perimeter surrounding the business; and
    if the current geographic location of the data input device is not within the pre-defined perimeter surrounding the business, saving the account management information form in memory.

4. The method of claim 3, wherein determining whether the current geographic location of the computing device is within the pre-defined perimeter surrounding the business comprises determining if the current geographical location of the computing device is equal to or less than a threshold distance from a geographical location of the business.

5. The method of claim 1, further comprising:
    determining that the current geographic location of the data input device enters within a pre-defined perimeter surrounding the business;
    tracking an amount of time elapsed since the data input device entered the pre-defined perimeter surrounding the business; and
    sending the amount of time elapsed since the data input device entered the pre-defined perimeter surrounding the business with the request to submit the account management information form to the server computer.

6. A computer-readable medium having computer-executable instructions stored thereon which, when executed by a computer, cause the computer to perform the method of claim 1.

* * * * *